(12) United States Patent
Fiorentini et al.

(10) Patent No.: US 8,709,313 B2
(45) Date of Patent: Apr. 29, 2014

(54) METHOD AND APPARATUS FOR FEEDING A POLYURETHANE MIXTURE INTO HOLLOW BODIES

(75) Inventors: Carlo Fiorentini, Varese (IT); Maurizio Corti, Varese (IT)

(73) Assignee: Afros S.p.A., Caronno Pertusella (IT)

( * ) Notice: Subject to any disclaimer, the term of this patent is extended or adjusted under 35 U.S.C. 154(b) by 317 days.

(21) Appl. No.: 13/047,245

(22) Filed: Mar. 14, 2011

(65) Prior Publication Data
US 2011/0221085 A1  Sep. 15, 2011

(30) Foreign Application Priority Data
Mar. 15, 2010 (IT) .............................. MI2010A 0415

(51) Int. Cl.
*B29C 44/42* (2006.01)
*B29C 44/34* (2006.01)
*B29C 44/18* (2006.01)

(52) U.S. Cl.
USPC ............... 264/40.1; 264/40.7; 264/328.12; 264/331.19; 264/297.2; 425/110

(58) Field of Classification Search
USPC ............. 264/51, 297.2, 328.12, 331.19, 40.1, 264/40.7; 425/110
See application file for complete search history.

(56) References Cited

U.S. PATENT DOCUMENTS

| | | | |
|---|---|---|---|
| 4,201,742 A * | 5/1980 | Hendry | 264/45.5 |
| 4,240,999 A | 12/1980 | Decker, Jr. | |
| 4,332,335 A | 6/1982 | Fiorentini | |
| 5,100,597 A * | 3/1992 | Erlenbach | 264/51 |
| 5,958,991 A | 9/1999 | Bartlett, Jr. | |
| 6,060,004 A * | 5/2000 | Takeuchi et al. | 264/40.1 |
| 6,506,325 B1 * | 1/2003 | Cartwright | 264/40.6 |
| 6,893,599 B2 * | 5/2005 | Howell et al. | 264/328.6 |
| 2008/0258324 A1 * | 10/2008 | Tanaka et al. | 264/40.5 |
| 2008/0284051 A1 | 11/2008 | Corradi | |

FOREIGN PATENT DOCUMENTS

| | | |
|---|---|---|
| DE | 19728648 A1 | 1/1999 |
| DE | 10243873 A1 | 4/2004 |
| EP | 0230921 A2 | 8/1987 |
| EP | 0374300 A1 | 6/1990 |

(Continued)

OTHER PUBLICATIONS

Italian Search Report, dated Jan. 27, 2011, from corresponding Italian application.

(Continued)

*Primary Examiner* — Joseph S Del Sole
*Assistant Examiner* — Nahida Sultana
(74) *Attorney, Agent, or Firm* — Young & Thompson (57) ABSTRACT

A method and apparatus for feeding a polyurethane mixture suitable to form a thermally insulating layer inside hollow bodies, such as hollow walls of a refrigerator cabinet, freezer, display counter or insulating panel. A polyurethane mixture resulting from chemically reactive components, supplied by a high-pressure mixing device, is injected into a cavity of a hollow body extending in a horizontal plain. The mixture is injected at a first flow-rate and a first injection speed, to be poured into a first deposition zone farthest from the injection point. Subsequently, the flow-rate and the injection speed of the polyurethane mixture are gradually reduced in a controlled manner, to be poured in successive deposition zones towards the injection point of the polyurethane mixture, along a distribution strip, allowing the injected mixture to spread out throughout the cavity of the hollow body along isometric expansion lines.

6 Claims, 9 Drawing Sheets

(56) References Cited

FOREIGN PATENT DOCUMENTS

| | | |
|---|---|---|
| EP | 1560687 B1 | 8/2005 |
| EP | 2023025 A2 | 2/2009 |
| EP | 2148156 A2 | 1/2010 |
| IT | 1135029 B | 8/1986 |
| IT | 1296471 B1 | 6/1999 |
| JP | 58222831 A | 12/1983 |
| JP | 9109171 A | 4/1997 |
| JP | 2009298113 A | 12/2009 |
| WO | 91/10551 A1 | 7/1991 |
| WO | 2006/013004 A1 | 2/2006 |

OTHER PUBLICATIONS

European Search Report, dated in May 26, 2011, in EP 11157960.

\* cited by examiner

METHOD AND APPARATUS FOR FEEDING A POLYURETHANE MIXTURE INTO HOLLOW BODIES

BACKGROUND OF THE INVENTION

This invention refers to a method and an apparatus suitable for feeding a polyurethane mixture to form thermally insulating layers into cavities of hollow bodies extending in a horizontal plane, providing a thermally insulating polyurethane foam for example into the hollow walls of refrigerator cabinets, household or industrial freezers, display counters or insulating panels, normally used in the building field, for cold-storage cells, or for other similar applications.

As known, polyurethane foams have several typical properties: in particular, the reaction between the polyurethane components, such as a polyol and an isocyanate, tends to develop heat and $CO_2$ gas, and cause the release of a foaming agent to generate a foam which rapidly expands, flowing into the cavity of a hollow body to fill it completely.

Polyurethane foams are also the best industrially available thermal insulating materials and are usable for all those applications for which polyurethane foam, in addition to forming a necessary thermally insulating layer, contributes to provide mechanical characteristics to a manufactured articles. These are the reasons why polyurethane foams are mainly used in the manufacture of refrigerator cabinets, freezers, thermally insulating panels and for other similar uses.

A hollow body, such as a refrigerator cabinet, a panel, usually comprises two opposite shells or plates which, in their assembled condition provide a cavity into which a metered quantity of a polyurethane mixture is injected; usually the polyurethane mixture is injected into the cavity of the hollow body laying into a horizontal plane, such as the back wall of a refrigerator cabinet on a support pallet of a foaming plant; the cabinet is supported in a so called "top open mouth" that is with the back wall resting on the horizontal pallet and the openings for the cabinet doors, facing upwards. Once injected, the polyurethane mixture chemically reacts and expands to form a foam which runs and rises into the cavity of the hollow body filling it completely; this technology is normally known as "RIM" or "Reaction Injection Molding".

PRIOR ART

Injection molding of polyurethane foams is currently performed by feeding, under pressure conditions, metered quantities of at least two liquid chemically reactive polyurethane components, to a high-pressure mixing device which transforms the pressure energy into a mixing energy by turbulence, with the advantages in terms of both quality of the resulting polyurethane mixture, and reduction of processing times in relation to the use of increasingly rapid chemical systems, as well as ensuring easy cleaning and maintenance.

In general, a high-pressure mixing device, usually called "mixing head", comprises one or more mixing chambers connected in series, provided with appropriate cleaning members; the chemical components are fed or injected through suitable nozzles or restrictions, in a manner that the jets of the liquid polyurethane components, due to their high kinetic energy, meet and collide with each other, generating a strong turbulence which causes their thorough mixture; consequently, the mixing device supplies a flow or a jet of liquid, or partially pre-expanded polyurethane mixture, the flow-rate and speed of which are depending on the flow-rates of the chemical components, and the cross-section of the outlet duct of the mixing device.

In a high-pressure mixing device, for example of the type described in U.S. Pat. No. 4,332,335 of the same Applicant, the jet of the outgoing polyurethane mixture has a speed, given by the ratio between flow-rate Q of the outcoming mixture and cross-section S of the outlet duct, which may vary between 0.2 and 10 m/s, depending on the flow-rate of the polyurethane components and the type of injection nozzles. In general, the flow of the outcoming mixture provides a laminar flow up to a speed of approximately 2 m/s, with accentuated turbulence for higher values, which increases as the flow-rate increases.

In order to inject a polyurethane mixture into a cavity of a hollow body, for example into the walls of a refrigerator cabinet, as shown, for example, in U.S. Pat. No. 4,240,999 and in WO 2006/013004, the outlet duct of the high-pressure mixing device is threaded into a hole on a side of the cavity between two shells, at one or more injection points chosen in a manner that the injected mixture, by impinging on inner surfaces, may run and expand to fill all the spaces.

However, injecting the polyurethane mixture against a surface, or in a direction different from the natural running of the mixture, causes several troubles.

In fact, the jet mixture, on hitting a surface or an opposite wall, generates vortexes which, by falling down for gravity, form several sprays and an irregular flowing of the mixture, with consequent inclusion of air bubbles, and lack of homogeneity in the structure and density of the foam.

To improve this technology, an attempt has been made by injecting the polyurethane mixture in a direction parallel to opposite surfaces of the cavity, or by maintaining the jet slightly slanted, for example upwards. The jet of the mixture therefore runs along a throw without touching any surface of the cavity; then, on falling down for gravity, starts to run along the surfaces with which it enters into contact; the jet of the liquid mixture, when comes into contact with a surface, splashes out and tends to further run forwards, depending on the injection speed.

The mixture subsequently starts to expand in all directions inside the cavity, generating a build-up of expanding mixture, the speed of which tends to slow down due to viscosity and the contact with the surfaces of the cavity, thereby preventing the flowing of the mixture which continues to be injected; waves and wrinkles are therefore generated in the mixture which tend to incorporate again air.

By the traditional technique, therefore it has been necessary to supply the mixture with a constant flow-rate and speed of the jet, sufficient to push the mixture beyond an expansion zone, so that the incoming flow of mixture which subsequently fed spreads on an average central zone.

Although this manner of proceeding allows a sufficient expansion of the polyurethane mixture, it once again causes uneven incorporation of air bubbles and remixing of the subsequently fed with the first injected mixture, which has already started to react and expand; this results in disturbance and partial collapsing of that part of the mixture which is already expanding, all this causing an uneven distribution of the mixture which is higher the greater the space the expanding mixture must cover to reach the farthest points of the cavity. By increasing the flowing speed of the foam against a surface to reach the farthest parts of the cavity in shorter times, in turn gives rise to the foaming of flattened cells, and a consequent structural unevenness.

In an attempt to partially solve these problems, DE 10243873 discloses a mixing device comprising a long supply pipe which extends into the cavity; the polyurethane mixture is fed at a preset flow-rate, while the mixing device and the supply pipe are gradually moved backwards to distribute the mixture in the cavity.

A similar solution, while it allows the polyurethane mixture to be distributed along the cavity, involves also a considerably complexity from both constructional and functional viewpoint; this derives from the need to coordinate the backwards movement of the mixing device and the supply pipe, with the speed of the outcoming flow of mixture, and to adopt automation mechanisms necessary to coordinate this movements. The supply pipe must necessarily be removed after each injection step, or after an extremely limited number of steps, replacing it with a new supply pipe; besides additional costs, this also leads to a consequent slow-down and complication of the productive cycle.

EP 0230921 of the same Applicant, discloses a foaming apparatus for refrigerator cabinets in which the cabinet is arranged with a "top open mouth" as previously stated, and in which the polyurethane mixture is injected from the top of a side wall, in a downward direction against a side edge of the back wall; no possibility exists to control the distribution of the mixture during the injection and fall down into the side walls. EP 0230921 merely discloses a system for monitoring control signals linked to the expansion of the foam into the cavity of the cabinet, and to change the flow-rate, or demolding parameters for a successive foaming step.

On the contrary, DE 19728648 discloses again a system for injecting and distributing a polyurethane mixture into the walls of a cabinet, by a feeding pipe vertically arranged in the back wall; the pipe is provided with a number of outlet slots from the upper to the lower end of the same pipe. Again no possibility exists to change the distribution of the polyurethane mixture, unless to change the features of the feeding pipe.

Objects of the Invention

The main object of this invention is to provide a method and an apparatus suitable for improving this technology, by controlling the distribution of the polyurethane mixture during the injection into a cavity of a hollow body or manufactured article.

In particular, an object of the invention is to obtain a condition of isometric expansion of the polyurethane foam which, by reacting and expanding at a basically constant speed, is thereby able to reach the farthest edges of the cavity to be filled, in extremely short and homogenous times, i.e. with expansion times which are very similar or basically the same; this reduces the incorporation of air bubbles and limits the collapsing and remixing of the foam which has already expanded and reacted. A foam is obtained which is structurally homogenous and has no excessively flattened cells; the expansion times of the foam can also be accelerated.

By the method and apparatus according to this invention, thanks to distribution and isometric expansion of the mixture, it is also possible to reduce the consumption of polyurethane material, obtaining a foam having same technical and mechanical characteristics of a polyurethane foam obtained by the traditional technology.

BRIEF DESCRIPTION OF THE INVENTION

The principle on which this invention is based consists in using a conventional high-pressure mixing device, to feed a chemically reactive polyurethane mixture, from an injection point into the cavity of a hollow body, extending in a horizontal plane, starting from a maximum flow-rate value and injection speed to pour the mixture at a first deposition zone positioned at a maximum distance from the injection point, and subsequently continuing the injection by gradually reducing the flow-rates and the injection speeds, allowing the injected mixture to be poured in successive deposition zones, to distribute the mixture from the first deposition zone to a zone closest to the injection point, along a longitudinal distribution strip, while maintaining a constant reaction ratio between the polyurethane components to have a homogeneous distribution and an isometric expansion of the mixture inside the cavity of the hollow body.

According to the invention, a method therefore has been provided for feeding of a polyurethane mixture into the cavity of a hollow body, and an apparatus suitable for actuation of said method.

In particular, according to a first aspect of the invention, a method has been provided for feeding a polyurethane mixture into a cavity of a hollow body extending in a horizontal plane, in which metered quantities of a first and at least a second chemically reactive polyurethane components are supplied to a high-pressure mixing device; and in which a resulting polyurethane mixture is injected into the cavity of the hollow body from an injection point, allowing the mixture to expand in a foam, characterised by the steps of:

injecting a metered quantity of the resulting mixture into said cavity, at a first flow-rate and injection speed, to be poured in a first deposition zone farthest from said injection point;

decreasing the flow-rate and the injection speed, making the polyurethane mixture to be poured in one or more successive deposition zones comprised between said farthest deposition zone and a final deposition zone close to the injection point; and keeping and/or changing the metered quantities of the injected polyurethane mixture poured in correspondence of each deposition zone.

According to another aspect of the invention, an apparatus has been provided suitable for feeding and injecting into a cavity of a hollow body, extending in a horizontal plane, a polyurethane mixture resulting from a first and at least a second polyurethane component, according to the method of claim 1, the apparatus comprising:

a high pressure mixing device having a mixing chamber and an outlet duct opening into the cavity of said hollow body;

feeding lines and metering pumps having adjustable throughput to feed metered quantities of the polyurethane components into the mixing chamber of the mixing device through injection nozzles, said metering pumps comprising a drive mean operatively connected to a programmable electronic control unit;

data input means for storing program data into the electronic control unit; and control means to feed-back the control unit with control data relating to flow-rates of the polyurethane components fed to the mixing device, characterised in that the control unit comprises:

memory means provided with program data comprising flow-rates reference data, and data relating to the metered quantities of polyurethane components to be fed to the mixing device; and a data processor comprising program means suitable for comparing the flow-rates reference data with flow-rates control data fed back by said control means, and for providing control signals for the drive means of the metering pump to change, in accordance with the memorised program data, the flow-rates and speed of the polyurethane mixture injected and poured at each of said deposition zones.

BRIEF DESCRIPTION OF THE DRAWINGS

The invention will be now described in greater detail, with reference to some examples of the attached drawings, in which.

DETAILED DESCRIPTION OF THE INVENTION

Figure 1:
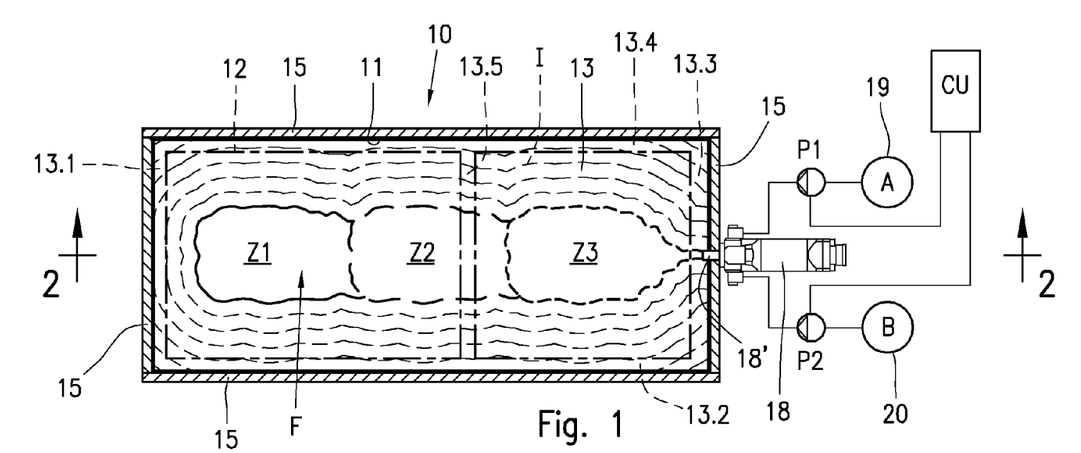
FIG. 1 is a longitudinal sectional view, according to line 1-1 of FIG. 2, of an apparatus for foaming of a refrigerator cabinet.
Figure 2:
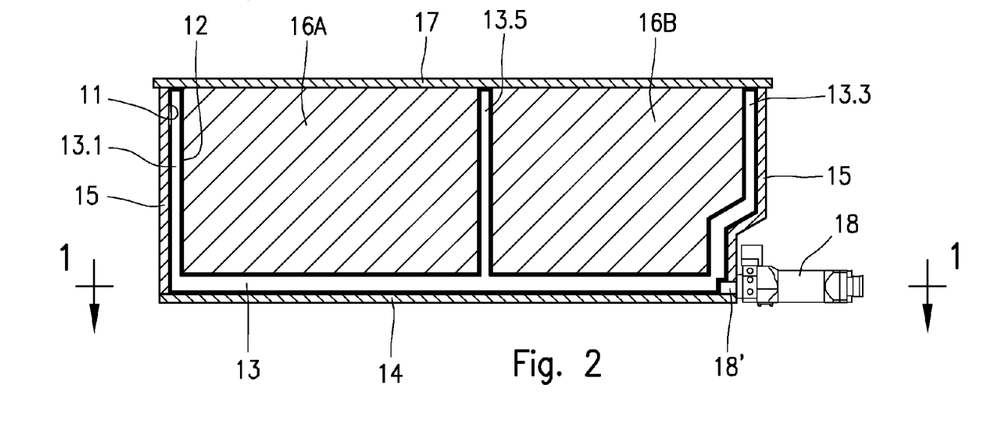
FIG. 2 is a sectional view according to line 2-2 of FIG. 1.

The method and some embodiments of an apparatus according to the invention will be illustrated in greater detail below, with reference to a polyurethane mixture for the production of a thermally insulating foam into the cavity of hollow walls of a domestic refrigerator cabinet; however, what will be stated with reference to the example of FIGS. 1 and 2 is to be intended for foaming of any other hollow body, for example any type of refrigerator cabinet for household or industrial use, freezers, refrigerated windows, or thermally insulating panels for building or for construction of cold-storage cells, or for any other suitable application.

FIG. 1 shows a cross sectional view of a refrigerator cabinet 10 for household use, comprising two opposite shells, in particular an external shell 11 and an internal shell 12 which, as shown in FIG. 2, in the assembled condition form a cavity in the hollow wall 13 or back wall of the refrigerator cabinet 10, the hollow side walls 13.1, 13.2, 13.3 and 13.4, and a possible intermediate wall 13.5.

In FIG. 1, the refrigerator cabinet 10 is shown in a "top open mouth" condition, that is with the cavity 13 of the back wall laying in a horizontal position, in which the cabinet is closed in a normal foaming jig, for example of the type described in IT 1296471 or US 2008/0284051, or another type as schematically shown; the foaming jig comprises a bottom pallet 14 supporting the cabinet 10, and side panels 15, suitable to react the thrust of the expanding polyurethane mixture against the external shell 11, while internal plug members 16A, 16B fixed to a cover 17, conform to the cavity of the refrigerator cabinet again to oppose the thrust of the expanding polyurethane mixture, against internal shell 12.

According to the invention, as will be explained in greater detail further on, a liquid or partially pre-expanded polyurethane mixture is supplied into the cavities of the hollow walls of the cabinet 10, keeping the latter in said typical position of "top open mouth", meaning that the openings of the cabinet on the side of the closure doors are facing upwards.

The polyurethane mixture is supplied into the cavity of the horizontal hollow wall 13, by injecting the same mixture from a side injection point by a mixing head or device 18 of the high-pressure type, having the outlet duct 18' threaded into a hole on the external shell 11, in order to direct the flow of the mixture in a longitudinal direction of the hollow back wall 17 parallel to facing surfaces of the two shells 11 and 12, or slightly inclined upwards.

Two chemically reactive polyurethane components A and B, such as a polyol and an isocyanate, stored in respective tanks 19 and 20, with additives and/or foaming agents, are supplied in a controlled manner and in metered quantities at a high pressure, between 40 and 250 bar, by respective nozzles opening into a mixing chamber of the mixing head 18, via respective metering pumps P1 and P2, which may be either the fixed displacement or variable displacement type, operatively connected to an electronic control unit CU, as described further on with reference to FIGS. 3, 9, 10, 11 and 14 of the drawings.

FIG. 1 shows, in a generic form, the innovative characteristics of the foaming method and apparatus of the invention, according to which a chemically reactive polyurethane mixture is poured and distributed along a longitudinal strip into the cavity of the hollow wall 13 of the refrigerator cabinet 10, by continuously, or discontinuously, injecting the mixture at decreasing speeds, and volumetric flow-rates, maintaining the mixing ratio of the chemical components A, B at a constant value, for variable times depending on the quantity of polyurethane mixture to be supplied at each deposition zone Z of the distribution strip F.

In particular, in FIG. 1, the reference F indicates a longitudinal distribution strip for the polyurethane mixture which, from the inlet point, at mixing head 18, is injected into the hollow wall 13, or more generally into a horizontal cavity of a hollow body, providing a jet of mixture, the throw range of which depends on the injection speed V.

The mixture distribution strip F, depending on the injection mode, as described further on, longitudinally extends from a first initial deposition zone Z1, the farthest from the injection point of the mixing head 18, at which a puddle of mixture is formed, towards at least one intermediate deposition zone Z2, and to a final deposition zone Z3 closest to the injection point.

As the positions of the deposition zones Z depends on the shape and dimension of the cavity into which the polyurethane mixture must be injected and distributed, by progressively reducing the flow-rate or throughput Q and speed V, and since the deposition zones may be practically chosen by performing suitable preliminary tests; within the present invention, the terms "farthest" and "closest" deposition zones are used to means respectively:

a first deposition zone far from the injection point of the mixing device, at which the polyurethane mixture is injected, that is a position close to a side wall of the cavity opposite to a side wall at which is positioned the injection point of the mixing device, and at which the maximum flow-rate Q and speed V, of the injected mixture, are depending on the dimension and shape of the cavity into which the polyurethane mixture is to be injected; and a last deposition zone close to the side wall of the cavity at which is positioned the mixing and injecting device.

Therefore, the general teaching of the invention consists in firstly injecting the polyurethane mixture with a maximum flow-rate and velocity made possible for a specific dimension and shape of the cavity, to pour a metered quantity of polyurethane mixture free from air bubbles, and successively reducing progressively the flow-rate and velocity of the injected mixture, to distribute the same mixture in metered quantities, from said "farthest" deposition point to said "closest" deposition point.

As already mentioned, the distribution of the polyurethane mixture along strip F is obtained by progressively reducing the volumetric flow-rates Q and consequently the injection speed V of the mixture along the deposition zones Z1, Z2 and Z3, by maintaining at a constant value or increasing and/or decreasing the metered quantities of mixture supplied in the time in each deposition zone Z, during each injection step; in addition to distribute the polyurethane mixture in a controlled manner along strip F, a total quantity of mixture is also fed into the cavity of the wall 13, sufficient to completely and evenly fill the hollow walls of the cabinet, or more generally, the cavity of a hollow body providing a layer of thermally insulating foam having a required density and characteristics.

As previously specified, the distribution of the polyurethane mixture along strip F must be such as to allow subsequent isometric expansion of the foam, as schematically indicated by the broken lines I in FIG. 1, up to the farthest upper points of the side walls 13.1-13.3—and central wall 13.5; in this way, the foam expands starting from the edges of distribution strip F, until it reaches the far edges of the cavity to be filled, for example the upper edges of the side walls in FIG. 2, in shortest and homogenous times, avoiding or reducing wave formation, overlapping of foam, and jumps depending from uneven filling times of the walls, which could cause incorporation of air bubbles and an uneven distribution of density and cells in the foam.

Figure 3:
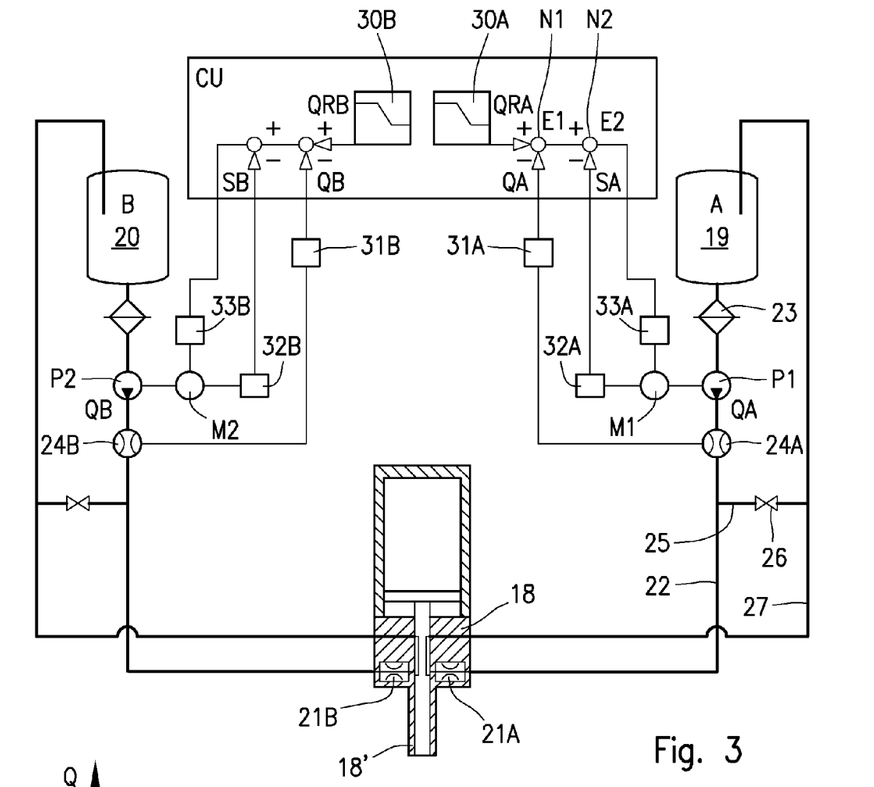
FIG. 3 shows a first diagram of the apparatus comprising a first control system.

With reference to FIG. 3, a first preferential embodiment of the foaming apparatus and control system according to the invention will now be described; in FIG. 3, the same reference numbers as FIGS. 1 and 2 have been used to indicate similar or equivalent parts.

In FIG. 3 has been shown the feeding and control circuit for one only of the two polyurethane components, for example component A, being understood that the feeding and control circuit of the other component B is identical to the control circuit of component A.

As shown, a flow-rate QA of component A contained in the storage tank 19, is fed to an injector 21A and into a mixing chamber of the high-pressure mixing head 18, by a feeding line 22, including a filter 23, a pump P1 operatively connected to an electric motor M1 and a flow transducer 24A downstream of pump P1. The feeding line 22 to the high-pressure mixing head 18 is further connectable to the storage tank 19 via a first recirculation line 25 for the component A, at a pressure lower than the one with which the same component is fed to be injected into the mixing chamber of the head 18 to be mixed by impingement with the component B.

Also in FIG. 3, the reference number 26 indicates a sectioning valve of the recirculation line 25, whereas reference number 27 indicates a second recirculation line of component A to storage 19, directly through the mixing head 18 and injector 21A, at the same pressure necessary for mixing both components A and B, and for the injection of the resulting mixture into the cavity of the hollow wall 13 of the refrigerator cabinet, or hollow body 10.

The above applies precisely for the flow-rate QB of component B, stored in the tank 20, controlled by flow transducer 24B, supplied in turn to a respective injector 21B of mixing head 18 by the metering pump P2 operatively connected to its own electric motor M2.

Calculation and control of the flow-rates QA and QB, the reaction ratio between the two polyurethane components A and B, and consequently the calculation and control of the flow-rates and speeds of the resulting flow of polyurethane mixture injected into the cavity of the hollow body 10, are obtained by a programmable electronic control unit CU; for the electronic control unit CU in FIG. 3, the control circuit relating solely to component A will be now described, being understood that the control circuit for the component B is entirely identical or equivalent to that of component A.

In the example under consideration, in the case of polyurethane component A, and similarly for component B, as will be furthermore explained with reference to FIG. 14, the control unit CU comprises a PLC or controller operatively connected to motor M1 of the metering pump P1; the control unit CU comprises a programmable RAM memory 30A, 30B provided with a software to generate reference signals QRA and QRB for the flow-rates of the polyurethane components A and B to be supplied respectively to nozzles 21A and 21B of the high-pressure mixing device 18. The control unit CU is also programmed to receive program data relating to variations in the flow-rates of the polyurethane mixture and quantities to be supplied for each deposition zone Z, that is to calculate and store in memories 30A and 30B of the control unit, the feeding times and variations in the flow-rates of the components A and B to be supplied to the high-pressure mixing device 18; consequently, to vary the volumetric flow-rate, speed, quantities and/or feeding times of the polyurethane mixture injected into hollow body 10, are depending on reference signals QRA, QRB into the memories 30A, 30B, and on the detected flow-rate control signals QA, QB for polyurethane components A and B.

Again in the case of polyurethane component A, each variable flow-rate reference signal QRA, QRB generated by memories 30A, 30B of the control unit CU is compared in a closed loop, in a first node N1, with the flow-rate control signal QA of component A fed to nozzle 21A of mixing head 18; the flow-rate control signal QA detected by flow transducer 24A is fed back to the control unit CU, for example through a pulse/frequency converter 31A. An error signal E1 from comparison mode N1, between QRA and QA, is in turn compared in a second node N2 with a control signal SA provided by a signal generator 32A, such as an encoder, connected to the electric motor M1 of the pump P1, in which the control signal SA corresponds with the actual volumetric flow-rate metered and supplied by pump P1.

Signal E2 from comparison between E1 and SA, in the second node N2, is sent in turn to a control circuit 33A for the electric motor M1, for example an inverter in the case of an AC electric motor, or a closed loop control circuit in the case of a DC electric motor.

As already mentioned, what has been said for component A also applies for component B; therefore, in FIG. 3, QB indicates the flow-rate measured by the flow transducer 24B, and QRB indicates the reference signal for the variable flow-rate, generated by memory 30B, while SB indicates the control signal of signal generator 32B.

Again with reference to the example of FIG. 3 and FIG. 4, the general characteristics of the method, according to the invention, will now be described together with the working of the apparatus in which the flow-rates of the two components A and B, and consequently the flow-rate and injection speed of the resulting mixture injected into the cavity of the hollow walls of refrigerator cabinet 10, vary between preset values, continuously decreasing along a single ramp, as shown.

Figure 4:
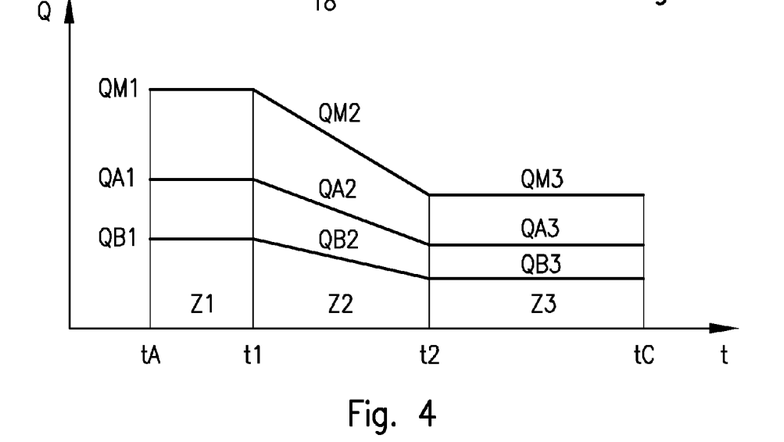
FIG. 4 is a graph showing the variations of the flow-rate, as a function of time, of two polyurethane components and a resulting mixture.

In particular, FIG. 4 shows the variation of the flow-rates QA and QB of the two polyurethane components A and B, and flow-rate QM of the resulting mixture, as a function of feeding time, and consequently the variation in speed of the jet and quantities of the mixture injected into the hollow walls 13 of refrigerator cabinet 10, at different injecting times for the three deposition zones Z1, Z2 and Z3.

Through an appropriate data input means and operator interface, for example a keyboard or a touch screen, the program data relating to the reaction ratio between components A and B, specific weight, feeding and injecting times, the respective flow-rate and quantity of mixture to be supplied in each single deposition zone Z1, Z2, Z3 are stored in a RAM memory of the control unit CU; the control unit CU, on the basis of its own program software, calculates and transfers into memories 30A, 30B the processed data relating to times and variation of the flow-rates depending on reference data QRA, QRB for each individual polyurethane component A and B, to control feeding of polyurethane components to the high-pressure mixing device 18.

The variation law of the flow-rate of the mixture may be expressed in any suitable way, through planes, ramps or other exponential type functions, or variations by points of the flow-rates, which the control unit CU will correlate, over the time, to the reaction ratio between components A and B, which must be maintained at a constant value for the entire feeding of the mixture, irrespective of the variations in flow-rate and the quantities of mixture to be supplied in each deposition zone.

According to the example in FIG. 4, the flow-rates of the two polyurethane components A and B vary from an initial flow-rate QA1 and QB1, to a final flow-rate QA3 and QB3 lower than the former ones, linearly decreasing in QA2 and QB2. In particular, the flow-rates QA1 and QB1 of components A and B and the resulting mixture QM1, starting from instant tA at the opening of the mixing head 18, are maintained at constant values QA1, QB1 according to the ratio set, for a period of time between tA and t1 to feed a total quantity M1 given by the integral of curve QM1 for the deposition zone Z1; then are varied by decreasing the flow-rate values QA2, QB2 between t1 and t2, in the deposition zone Z2 to supply a total quantity M2 given by the integral of QM2, up to the flow-rates QA3, QB3, which remain constant in the period of time between instant t2 and instant tC at which the closure of mixing head 18 takes place; the total quantity M3 of the supplied mixture is given by the integral of QM3.

The flow-rates of mixture M1, M2, M3 resulting from the sum of the flow-rates of the individual components QM1, QM2 and QM3 therefore follow the same variations previously described.

Returning again to the example of FIG. 1 and FIG. 4, according to this invention, the polyurethane mixture is injected and distributed along strip F, by varying the feeding time and flow-rate Q of the mixture, and consequently the speed and throw of the jet, from a high flow-rate value QM1 suitable to throw the mixture jet into a first deposition zone Z1 and for formation of a puddle farthest from the injection point at the mixing head 18, to a low flow-rate value QM3 suitable to throw and pour the mixture at a lower speed into the deposition zone Z3 closest to the mixing head 18, passing through one or more intermediate deposition zones, such as the intermediate deposition zone Z2; in this way, the polyurethane mixture is gradually injected and distributed in the required quantities along strip F. On the basis of process requirements, during distribution of the polyurethane mixture along strip F, the flow-rates Q of mixture relating to each deposition zone are maintained and/or changed for preset periods, so that the total quantity of the injected mixture, starting from the peripheral edges of strip F progressively expands along isometric lines I, as schematically indicated in FIG. 1.

In general, the flow-rate of the polyurethane mixture is reduced by a maximum value, at the farthest deposition zone Z1 for formation of the initial puddle, along strip F, to a minimum final value at the closest deposition zone Z3, between 15% and 85% of the initial maximum flow-rate, depending on the planned application. In particular, in the case of refrigerator cabinets and other similar applications, the flow-rate of the polyurethane mixture is preferably decreased to a minimum value between 30% and 70% of the initial maximum value.

For these amounts of variation in the flow-rates, in a high-pressure mixing head, injectors 21A and 21B are normally used, each provided with a respective injection nozzle for the individual polyurethane components, in which the position of an internal pressure adjusting pin is subjected to a reaction spring; in this way it is possible to continuously adapt, automatically and passively, the restricted outlet section of the individual nozzles, and the feeding pressure to the nozzles of components A and B, to the variations in the flow-rate, maintaining a constant reaction ratio and good mixing conditions even at low flow-rates; the above also applies to injecting nozzles for components A and B consisting of restricted outlet holes for supplying components A, B in a common chamber from which both components flow at a same pressure into a mixing chamber, as described, for example, in EP 1560687 of the same Applicant.

For higher variations in the maximum flow-rate calculated, for example higher than 50%, it is advisable to use controlled injectors in which the position of the pressure control pin may be changed by means of an appropriate active control mean of hydraulic, electric or pneumatic type, depending on the value of flow-rate to be supplied; spring loaded or adjustable type injectors are shown for example in IT 1135029 of the same Applicant, in EP 0374300, or in EP 2023025.

With reference to FIGS. 5 to 8, several possible embodiments of the method according to the invention will be described.

Figure 5:
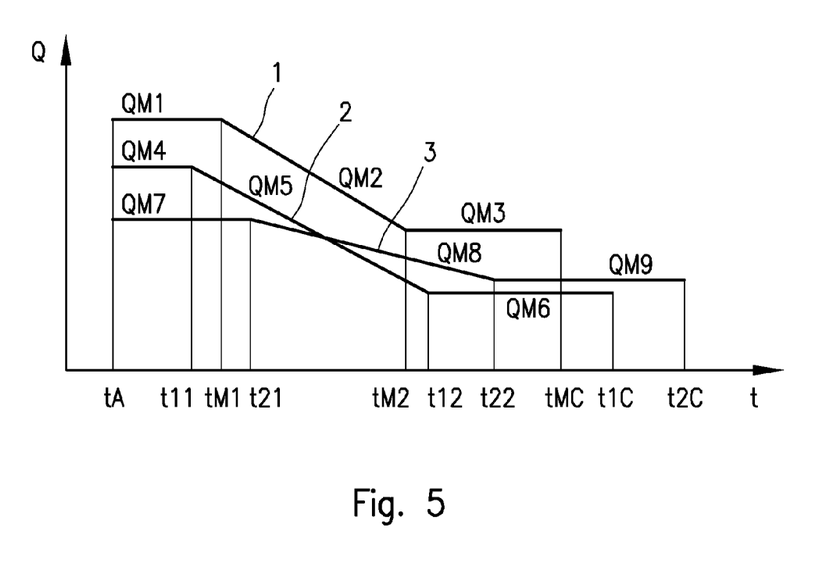
FIG. 5 is a graph showing the variations of the flow-rate, as a function of time, for three different flow-rates of polyurethane mixtures.

FIG. 5 shows three different curves 1, 2 and 3 of flow-rates of the mixture, a single-ramp type, in which a linear reduction of the flow-rates takes place between an initial maximum value and a final minimum value; in particular, the graph in FIG. 5 proves the great versatility and adaptability of the method according to the invention, by which it is possible to vary or change in a controlled mode the flow-rates, specific feeding times and total quantity of injected mixture for each deposition zone, to adapt to different uses and requirements.

For example, comparing flow-rates and times between curves 1 and 2, it may be noted that the initial flow-rate QM1 of curve 1 is maintained at a constant value for a period of time between the initial instant tA at the opening of the mixing head 18, and instant tM1, whereas the variable flow-rate QM2 is maintained for a longer period of time between instants tM1 and tM2; in turn, flow-rate QM3 is maintained at a constant value between instants tM2 and tMC at the closure of the mixing head, for a period of time exceeding the one of QM1.

In contrast, on curve 2, the initial flow-rate QM4 is maintained at a lower constant value for a period of time between tA and t11 lower than the one of QM1; similarly, the variable flow-rate QM5 is maintained with a same slope or gradient for a period of time between t11 and t12, higher than QM2; in contrast, the flow-rate QM6 is maintained at a lower value and for a period of time between t12 and t1C, higher than QM3.

In turn, the initial flow-rate QM7 of curve 3 is maintained at a constant value for a time between tA e t21, higher than the one of curves 1 and 2, whereas the variable flow-rate QM8 has a lower gradient for a period of time between t21 and t22, continuing with QM9 at a constant flow-rate between t22 and t2C, which extends beyond instants tMC and T1C of curves 1 and 2.

Since the integral of flow-rates QM in time t corresponds with the quantity of the mixture supplied in each deposition zone of the distribution strip F, besides constituting the total quantity of the mixture supplied into the hollow walls of the refrigerator cabinet 10, or, more generally, into the hollow body, this proves the enormous versatility and capacity of the method to be adapted to the various requirements of use and to different conformations of the hollow bodies, simply by varying in a controlled mode the speeds and feeding times that is the quantity of the injected mixture, as well as by changing the zones for deposition and formation of the puddles of mixture.

Figure 6:
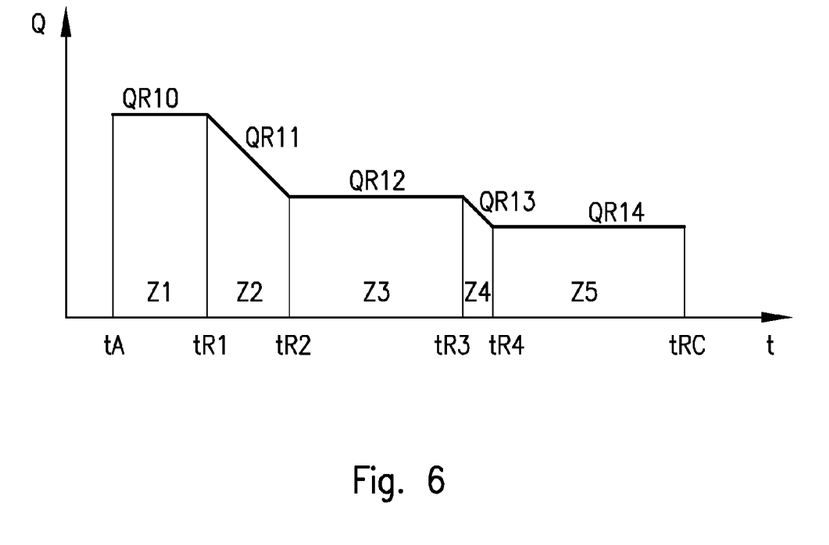
FIG. 6 is a further graph showing variations in the flow-rate, as a function of time, comprising several deposition zones at constant flow-rates and different deposition zones having ramps or decreasing flow-rates.

FIG. 6 shows a two-ramp configuration of the flow-rates reduction graph along a distribution strip F for the mixture, comprising five deposition zones Z1, Z3 and Z5, with constant feeding flow-rates QR10, QR12 and QR14, and intermediate deposition zones Z2 and Z4 with variable flow-rates QR11 and QR13, for variable periods of time defined by instants tA, tR1, tR2, tR3, tR4 and tRC.

Figure 7:
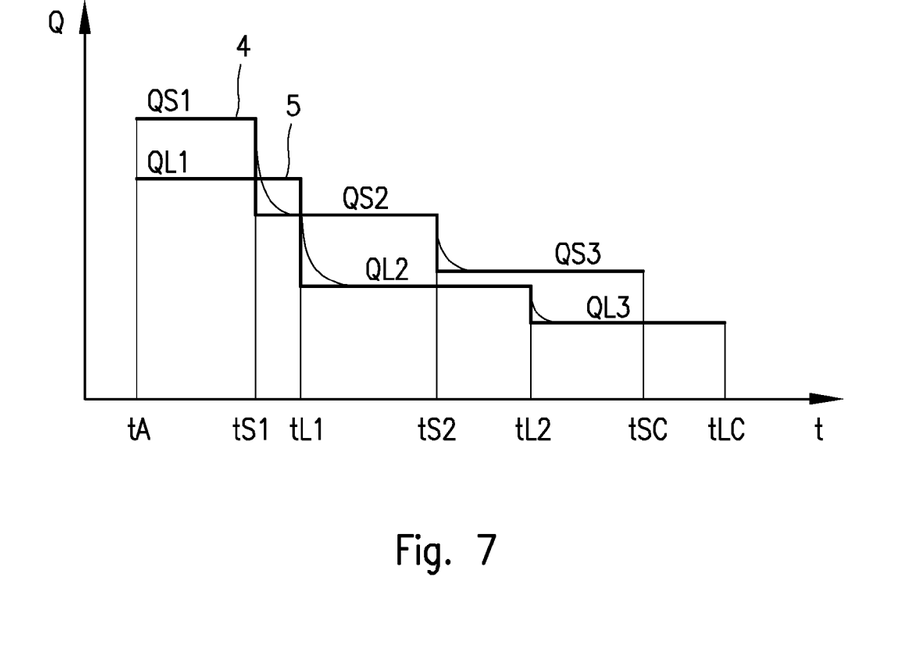
FIG. 7 shows two graphs relating to variations in the flow-rate, as a function of time, of the step type.

FIG. 7 shows a step variation of the flow-rates QS and QL according to curves 4 and 5; in particular, shows the possibility of varying the values and feeding durations of flow-rates QS1, QS2 e QS3 of curve 4, compared with the values and the durations of flow-rates QL1, QL2 and QL3 of curve 5, in instants tA, tS1, tS2, tSC, respectively tA, tL1, tL2 and LC.

In the previous cases, the changes in the flow-rates and feeding times may be performed by adjusting the rotational speed of the metering pumps P1 and P2 for the two polyurethane components A and B, according to program data stored in the memory of the control unit CU of FIG. 3.

As an alternative to the control by adjustment of the metering pumps P1 and P2, the flow-rates and consequently the times and speeds of the jet of the mixture may be controlled in a discontinue mode by acting on the drive motors of pumps P1, P2 in combination with the opening and closing times of the high-pressure mixing head 18, and the recirculation times of the individual components, between successive feeding steps.

Figure 8:
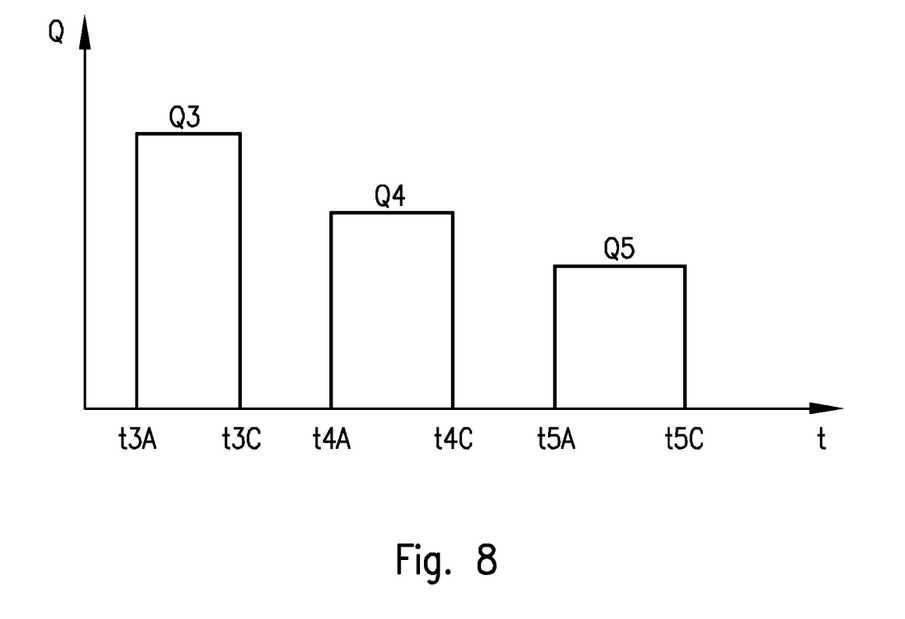
FIG. 8 shows a further graph of the flow-rate, as a function of time, obtained by successive opening and closing steps of a high-pressure mixing device.

The above is shown by way of example in FIG. 8, where Q3, Q4 and Q5 indicate three different values of constant flow-rates, for three separate and subsequent sequentially actuated feeding steps, in the periods of time t3A-t3C, t4A-t4C and t5A-t5C, where the periods of time t3C-t4A and t4C-t5A represent the recirculation times of the chemical components A and B through the mixing head 18 in the closed condition of the outlet duct.

Figure 9:
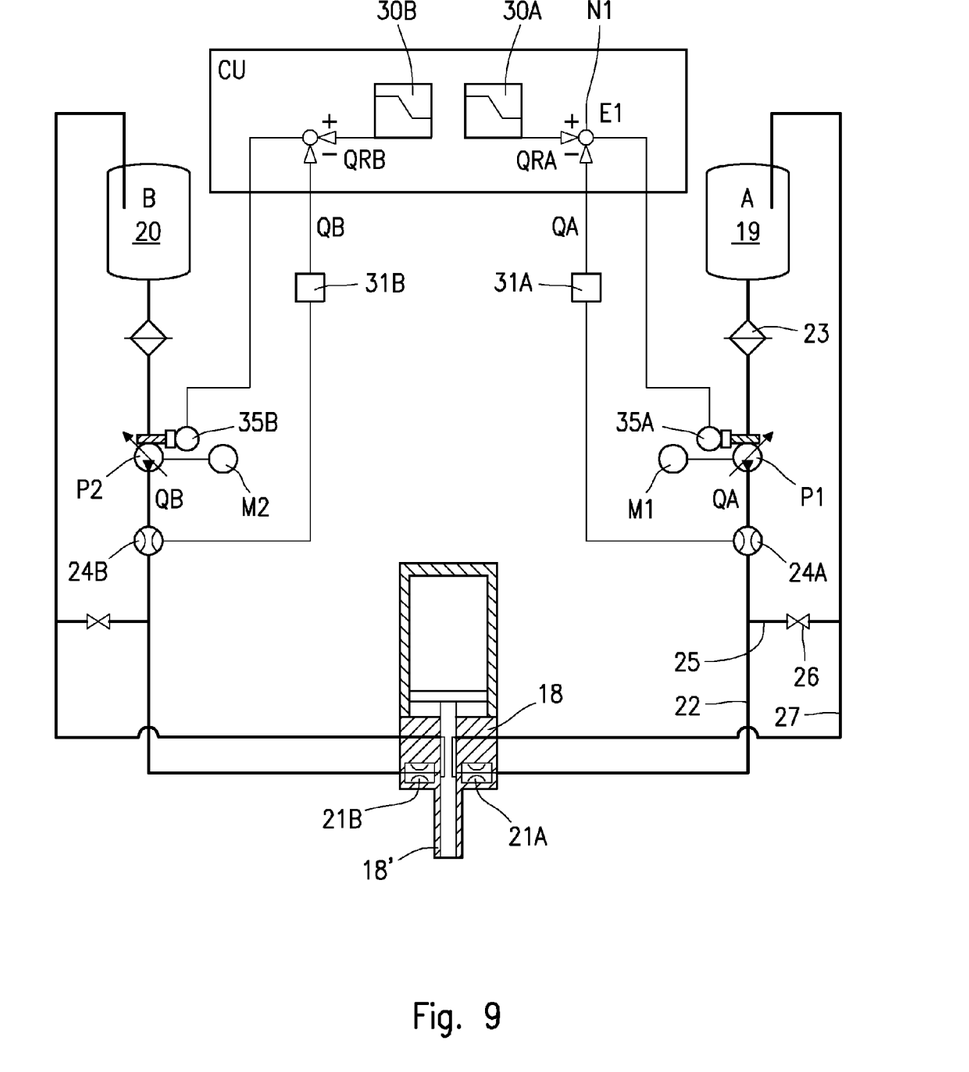
FIG. 9 shows a block diagram of the apparatus comprising a second control system.

FIG. 9 shows a second diagram of the apparatus and control system; in FIG. 9, the same reference numbers and letters of FIG. 3 have been used to indicate similar or equivalent parts, adding once again to each reference number the suffix "A" and the suffix "B" for the control part relating to the two polyurethane components A and B.

The control system of FIG. 9 differs from FIG. 3 in that variable displacement pumps P1 and P2 are used in place of the fixed displacement pumps of FIG. 3. Variable displacement pumps provided with adjustable disc rotor are widely known and differ from fixed displacement pumps by the possibility of changing in a controlled mode the volume of fluid pumped for each rotation, using a special adjusting device; variable displacement pumps of A2VK type are manufactured, for example, by the German company Rexroth (Bosch Group), and C07, C20, P38 type manufactured by the British company Rotary Power.

The control system of FIG. 9 differs from the control system of FIG. 3 in its greater simplification. In particular, the reference signal QRA of variable flow-rate generated by memory 30A of the control unit CU, as previously mentioned, is compared in a node N1 with signal QA of the flow-rate from pump P1 to nozzle 21A of the high-pressure mixing device 18; the signal E1 resulting from this comparison is sent to the displacement regulator 35A for pump P1. What has been said for the control system for component A applies also to the control system for component B.

The apparatus and control system for the flow-rates of components A and B of FIG. 9, operate in an entirely identical manner to the apparatus and control system previously described, according to the method of the invention, in all its possible variants, with the difference that motors M1 and M2, and consequently pumps P1 and P2, are now actuated at a constant speed, whereas the flow-rates may be changed by means of the displacement regulator 35A, 35B, depending on the reference signals QRA and QRB.

Figure 10:
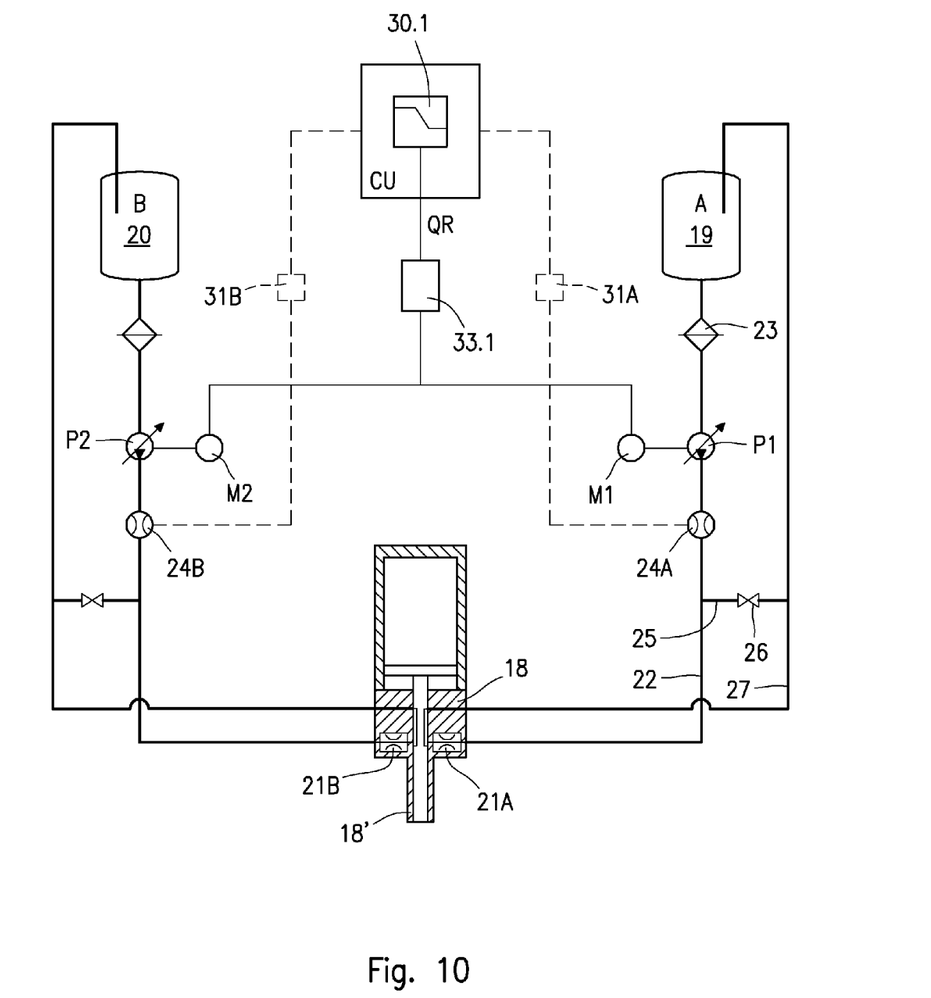
FIG. 10 shows a block diagram of the apparatus comprising a third control system.

FIG. 10 shows a third solution of the control system for the flow-rates of polyurethane components A and B; once again, the same reference numbers and suffixes have been used to indicate similar or equivalent parts.

In the example in FIG. 10, use is made once again of pumps P1 and P2 of variable displacement type; however, in this case, the displacements of the two pumps are adjusted to supply a constant volume of fluid, at each rotation, depending on a preset chemical reaction ratio of components A and B.

The total flow-rate, on the other hand, is controlled by changing the rotational speed of the respective control motors M1 and M2.

On the basis of this third solution, it is possible further to simplify the control system, comprising an electronic control unit CU provided with a single RAM memory 30.1 forming part of a single control loop, and a single inverter or supply circuit 33.1, operatively connected to both the electric motors M1 and M2 of the two pumps P1 and P2.

The apparatus and control system of FIG. 10 also operate in the same manner previously described to implement the method according to this invention.

Figure 11:
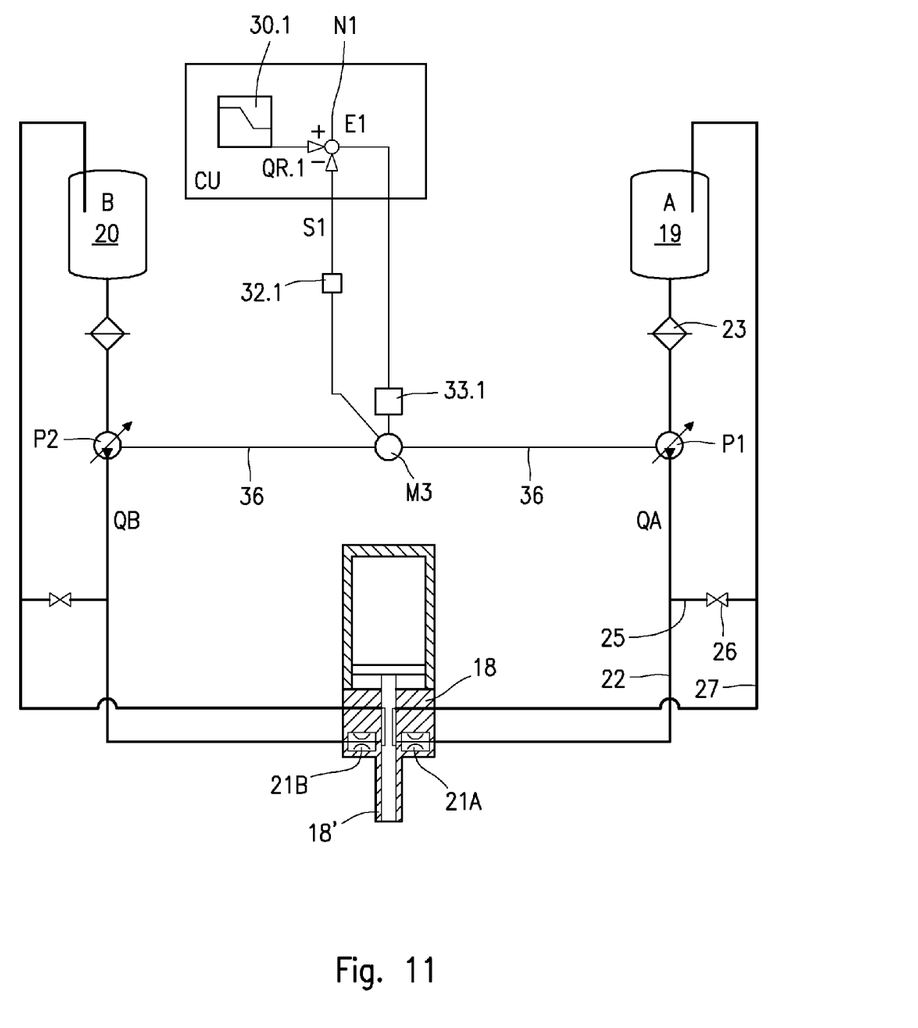
FIG. 11 shows a block diagram of the apparatus comprising a fourth control system.

FIG. 11 shows a fourth variant of the control system for the flow-rates of polyurethane components A and B, which leads to further simplification; once again, the same reference numbers are used and the same suffixes to indicate similar or equivalent parts.

In this case as well, use is made of pumps P1 and P2 of variable displacement type, in which the displacements are duly pre-adjusted to supply a constant volume of fluid at each preset rotation, depending on the chemical reaction ratio, as in the previous case.

The solution in FIG. 11 differs in that use is made of a single electric control motor M3, provided with a double control shaft 36 or mechanical transmission system operatively connected to both pumps P1 and P2. As in the case of FIG. 3, the rotor of motor M3 is connected to a signal generator 32.1 suitable to supply to comparison node N1 a signal S1, proportionate to the rotational speed of motor M3, and therefore proportionate to flow-rates QA and QB, in the desired chemical reaction ratio of the components A and B.

Signal S1 in node N1 is compared with the reference signal QR1 of the variable flow-rate shared by both components, generating a signal E1 which is sent to the inverter or feeding circuit 33.1 for motor M3; in this case as well, the apparatus and the control system are suitable for operating according to the described method, in all its possible variants.

In the previous example of FIGS. 1 and 2, the method and equipment according to this invention have been described with reference to the injection of the polyurethane mixture into hollow walls 13, 13.1, 13.2, 13.3, 13.4, 13.5 of a refrigerator cabinet 10; the example of FIGS. 12 and 13, on the other hand, shows methods for injecting a polyurethane mixture into the cavity of a thermally insulating panel, for example in building field, or for construction of cold-storage rooms or cells, or refrigerated environments; also in FIGS. 12 and 13, the same reference numbers are used as in FIGS. 1 and 2 to indicate similar or equivalent parts.

Figure 12:
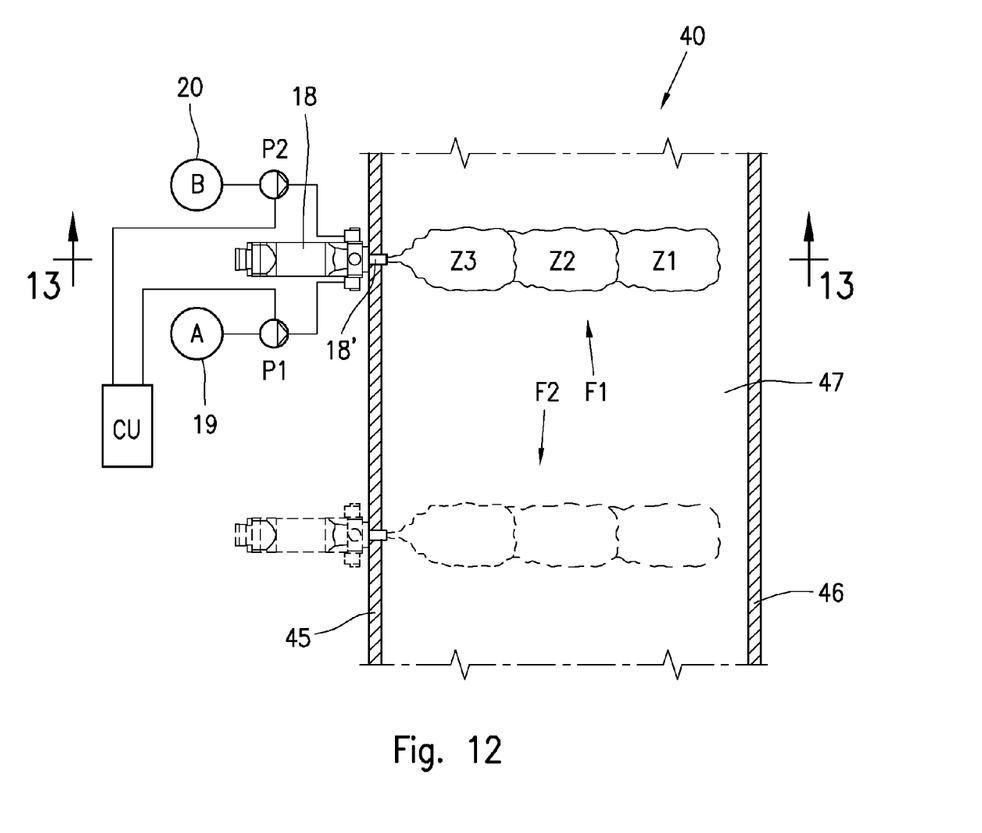
FIG. 12 shows a horizontal section of a panel according to line 12-12 of FIG. 13, in combination with an apparatus according to the invention.
Figure 13:
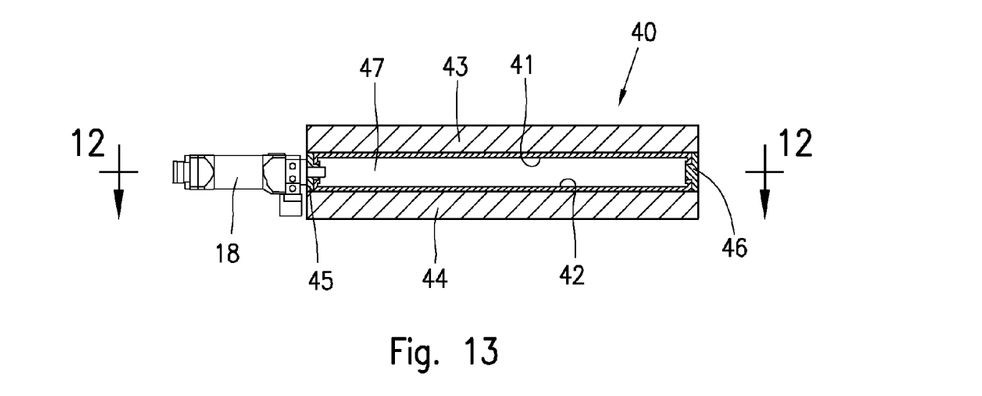
FIG. 13 shows a cross sectional view of the panel, according to line 13-13 of FIG. 12.

Since the length of the panels may vary from a few meters up to a dozen meters and beyond, depending on the dimensions of the panel the injection of the polyurethane mixture may occur from a single injection point, in the longitudinal direction of the panel, or, as shown in FIGS. 12 and 13, for a panel with large dimensions, partially shown, the injection of the polyurethane mixture may occur in a cross direction, at several injection points from one and/or both side edges of the panel.

In particular, in FIGS. 12 and 13, a panel 40 is shown comprising two opposite shells 41, 42 between thrust plates 43, 44, and spacers 45, 46 on the two longitudinal edges of the shells 41, 42, which, as a whole, define a cavity 47 into which a polyurethane mixture must be injected via a high-pressure mixing head 18, according to one of the methods previously described.

It is specified that, in FIG. 12, the unbroken line indicates injection of the polyurethane mixture along a first distribution strip F1 through a first hole in the spacer 45, whereas the broken lines indicate injection of the polyurethane mixture and its distribution along a second strip F2, after moving and positioning the mixing head 18 at a second hole in the spacer 45.

Figure 14:
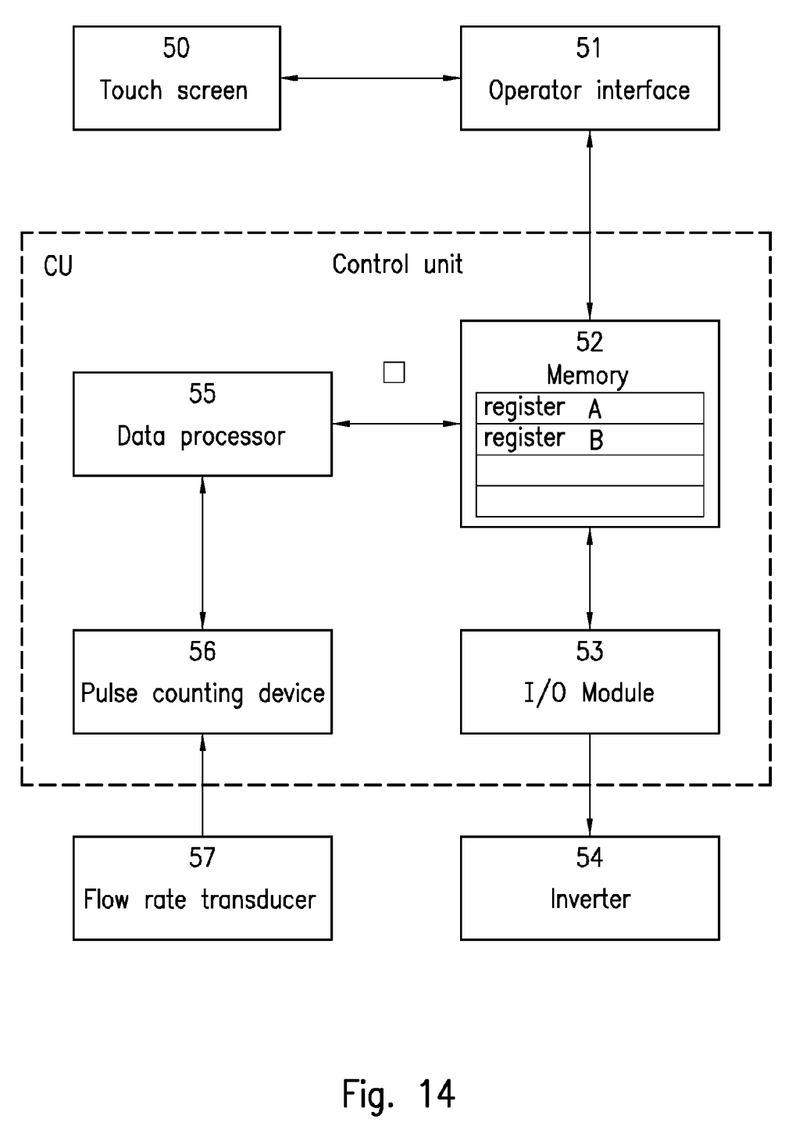
FIG. 14 is a block diagram of the control unit of the apparatus according to the invention.

Lastly FIG. 14 shows a block diagram of control unit CU comprising memory means and a processor conformed and programmed to be used in an apparatus and for a method according to the invention. In FIG. 14 the control unit CU is shown as comprising one memory only to control the feeding of a polyurethane component; nevertheless the control unit CU may comprise a memory for controlling each component A and B, or one single for both components, as previously specified.

The example of FIG. 14 comprises input means 50, such as a touch screen, operatively connected to the memory 52 by an operator interface 51, to store in a first set of registers of the memory 52, first program data, comprising:
a) mixing ratio between the polyurethane components A, B;
b) specific weight of the components A, B;
c) reference values of the flow-rates for each deposition zone;
d) time intervals and/or total metered quantities of polyurethane components to be fed to the mixing device 18, and/or corresponding metered quantity of polyurethane mixture to be injected for each deposition zone;
e) total quantity of polyurethane mixture to be injected into the cavity of the hollow body 10.

The memory 52 is connected, by an I/O module 53, to a control circuit such as an inverter 54 for the driving motor of a feeding pump. The memory 52 is connected also to a processor 55, such as a CPU, programmed for processing the program data stored in the memory 52 and to provide the same memory with operative data relating to flow-rates and quantities of polyurethane components and resulting mixture to be injected for each deposition zone.

Therefore the processor 55 is programmed to process the program data received by the memory 52, to perform the necessary mathematic operations required to calculate the operative condition and data to be stored in a second set of registers of the memory 52.

In particular the processor 52: calculates the numbers of pulses of the pulse counting device or counter 56 of each polyurethane component A, B, corresponding to the start and final injection times for each deposition zone at constant flow-rate value, and ramps, storing said calculated data in corresponding registers of the RAM memory 52; provides control data for the pulse counting device 56 of the pulses fed-back by flux-transducers of each polyurethane component feeding line, and/or of the rotational speed of the driving motors M of the pumps P, comparing said pulse data with reference pulse data stored in the memory 52. In other terms, the processor 55 perform all the comparison operations of signals QRA, QRB, QA, QB of the previously described examples of the method and apparatus according to the invention.

What has been said and shown with reference to the attached drawings is intended for illustrative purposes of the general features of the invention, and some preferential embodiment.

Other modifications or variants may therefore be made to the method and apparatus without departing from the claims.

The invention claimed is:

1. A method for feeding a polyurethane mixture into a cavity of a hollow body extending in a horizontal plane, in which metered quantities of a first and at least a second chemically reactive polyurethane component are supplied to a high-pressure mixing device, the method comprising:
generating, by an electronic control unit, reference signals for flow-rate values of the polyurethane components to be supplied to the high-pressure mixing device for each of one or more successive deposition zones disposed between a first deposition zone farthest from an injection point and a final deposition zone closest to the injection point, the metered quantities of the first and at least the second chemically reactive polyurethane components being supplied to the high-pressure mixing device by a respective metering pump having a drive motor operatively connected to the electronic control unit;
injecting a resulting polyurethane mixture into the cavity of the hollow body from the injection point;
distributing the polyurethane mixture along a longitudinal strip by pouring metered quantities of the mixture in the one or more successive deposition zones disposed between the first deposition zone farthest from the injection point and the final deposition zone closest to the injection point, in successive injection steps;
detecting and feeding to the control unit the flow-rate values of the polyurethane components supplied to the high-pressure mixing device;
comparing, in a first closed loop, each of the reference signals with the detected flow-rate values of the polyurethane components supplied to the high-pressure mixing device, and providing an error signal at a first comparison node;

detecting a control signal by a signal generator connected to the drive motor of the pump;

comparing the error signal with the detected control signal of the motor of the metering pump, and providing a comparison signal at a second comparison node;

feeding the comparison signal to a control circuit of the metering pump;

discontinuing the injection of the polyurethane mixture at the end of each injection step;

recirculating the polyurethane components through the high-pressure mixing device to control flow-rates of the polyurethane components using the comparison signal; and successively injecting the polyurethane mixture into the cavity of the hollow body by reducing the flow-rates and an injection speed to pour in a successive deposition zone.

2. The method according to claim 1, further comprising keeping constant or changing the metered quantity of the injected polyurethane mixture poured in correspondence of each deposition zone.

3. The method according to claim 1, wherein the flow-rates and the injection speed of the polyurethane mixture are reduced in a range between 15% and 85% with respect to the farthest deposition zone.

4. The method according to claim 1, wherein the flow-rates and the injection speed are reduced in a range between 30% and 70% with respect to the farthest deposition zone.

5. The method according to claim 1, wherein the polyurethane mixture is injected into a cavity of a refrigerator, freezer or insulating panel.

6. The method according to claim 3, wherein the flow-rates and the injection speed are reduced in a range between 30% and 70% with respect to the farthest deposition zone.

* * * * *